US012351991B2

(12) United States Patent
Glanzer

(10) Patent No.: US 12,351,991 B2
(45) Date of Patent: Jul. 8, 2025

(54) PLATE COMPACTOR INCLUDING BELT TENSIONER ASSEMBLY

(71) Applicant: MILWAUKEE ELECTRIC TOOL CORPORATION, Brookfield, WI (US)

(72) Inventor: Evan M. Glanzer, Milwaukee, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 830 days.

(21) Appl. No.: 17/533,799

(22) Filed: Nov. 23, 2021

(65) Prior Publication Data

US 2022/0162813 A1 May 26, 2022

Related U.S. Application Data

(60) Provisional application No. 63/117,536, filed on Nov. 24, 2020.

(51) Int. Cl.

*E01C 19/38* (2006.01)
*B06B 1/16* (2006.01)
*E01C 19/40* (2006.01)

(52) U.S. Cl.

CPC .............. *E01C 19/402* (2013.01); *B06B 1/16* (2013.01); *E01C 19/38* (2013.01)

(58) Field of Classification Search

CPC ........ E01C 19/35; E01C 19/38; E01C 19/402; B06B 1/16
USPC .............................. 404/133.05, 133.1, 133.2
See application file for complete search history.

(56) References Cited

U.S. PATENT DOCUMENTS 3,631,734 A * 1/1972 Wagner ..................... F16H 7/14 474/117
3,703,127 A * 11/1972 Kaltenegger ........... E02D 3/074 404/113
3,732,022 A 5/1973 Danuser
4,359,296 A * 11/1982 Cronkhite ............. E01C 19/402 404/114
4,595,384 A 6/1986 Tertinek (Continued)

FOREIGN PATENT DOCUMENTS

CN 2633941 Y 8/2004
CN 204139155 U 2/2015

(Continued)

OTHER PUBLICATIONS

International Search Report and Written Opinion for Application No. PCT/US2021/060554 dated Mar. 18, 2022 (10 pages).

(Continued)

*Primary Examiner* — Gary S Hartmann
(74) *Attorney, Agent, or Firm* — Michael Best & Friedrich LLP

(57) ABSTRACT

A compactor includes a plate, a frame coupled to the plate, an exciter assembly coupled to the plate, and a motor movably coupled to the frame for driving the exciter assembly. The motor is coupled to the exciter assembly by a belt. The compactor further includes a tensioner assembly configured to tension the belt. The tensioner assembly includes a threaded shaft having a first end coupled to the plate and a second end coupled to the motor. The motor is movable along an axis parallel to a longitudinal axis of the plate.

11 Claims, 4 Drawing Sheets

(56) References Cited

U.S. PATENT DOCUMENTS

| | | | | | |
|---|---|---|---|---|---|
| 4,917,654 | A * | 4/1990 | Edwards | F16H 7/1281 474/135 |
| 4,947,940 | A | 8/1990 | Dickey et al. | |
| 5,131,525 | A * | 7/1992 | Musschoot | B06B 1/166 198/770 |
| 5,439,314 | A * | 8/1995 | Wadensten | E01C 19/38 404/133.05 |
| 5,672,027 | A * | 9/1997 | Wadensten | E01C 19/38 404/133.05 |
| 6,231,331 | B1 * | 5/2001 | Lievers | E04G 21/10 425/456 |
| 6,575,858 | B2 * | 6/2003 | Green | F16H 7/1254 474/138 |
| 6,837,648 | B1 * | 1/2005 | Wadensten | E01C 19/283 404/117 |
| 7,540,688 | B1 * | 6/2009 | Suckow | E04F 21/242 404/114 |
| 2001/0001274 | A1 * | 5/2001 | Fix | E01C 19/402 404/114 |

FOREIGN PATENT DOCUMENTS

| | | | |
|---|---|---|---|
| CN | 205975572 | U | 2/2017 |
| CN | 206529761 | U | 9/2017 |
| CN | 206887929 | U | 1/2018 |
| CN | 208251064 | U | 12/2018 |
| DE | 102008011208 | B3 | 9/2009 |
| JP | H09329207 | A | 12/1997 |
| JP | H10132041 | A | 5/1998 |
| JP | H11323820 | A | 11/1999 |
| JP | 2000097299 | A | 4/2000 |
| JP | 2015169014 | A | 9/2015 |
| WO | 2006001230 | A1 | 1/2006 |
| WO | 2011157344 | A1 | 12/2011 |

OTHER PUBLICATIONS

Extended European Search Report for Application No. 21899028.1 dated Jan. 8, 2025 (10 pages).

* cited by examiner

PLATE COMPACTOR INCLUDING BELT TENSIONER ASSEMBLY

CROSS-REFERENCE TO RELATED APPLICATIONS

This application claims priority to U.S. Provisional Patent Application No. 63/117,536 filed on Nov. 24, 2020, the entire content of which is incorporated herein by reference.

FIELD OF THE INVENTION

The present invention relates to plate compactors.

BACKGROUND OF THE INVENTION

Plate compactors include a plate that is caused to vibrate in order to compact soil or other loose material.

SUMMARY OF THE INVENTION

The present invention provides, in one aspect, a compactor comprising a plate, a frame coupled to the plate and an exciter assembly coupled to the plate and including an exciter shaft, an exciter pulley on the exciter shaft, and an eccentric weight on the exciter shaft. The compactor further includes a motor coupled to the frame and including an output shaft and a drive pulley on the output shaft. The compactor further includes a tensioner assembly including an idler arm pivotably coupled to the frame and including a first end and second end, an idler pulley on the first end of the idler arm, and a spring coupled to the frame and the idler arm. The compactor further includes a belt wrapped around the exciter pulley, the drive pulley, and the idler pulley. The spring biases the idler arm in a first direction to engage the belt with the idler pulley and maintain tension in the belt.

The present invention provides, in another aspect, a compactor including a plate, a frame coupled to the plate, and an exciter assembly coupled to the plate and including an exciter shaft, an exciter pulley on the exciter shaft, and an eccentric weight on the exciter shaft. The compactor further includes a motor movably coupled to the frame and including an output shaft and a drive pulley on the output shaft, a belt wrapped around the exciter puller and the drive pulley, and a tensioner assembly including a threaded shaft. A first end of the threaded shaft is coupled to the plate and a second end of the threaded shaft is coupled to the motor.

The present invention provides, in yet another aspect, a compactor including a plate, a frame coupled to the plate, and an exciter assembly coupled to the plate and including an exciter shaft, an exciter pulley on the exciter shaft, and an eccentric weight on the exciter shaft. The compactor further includes a motor coupled to the frame and including an output shaft and a drive pulley on the output shaft, a belt wrapped around the exciter pulley and the drive pulley, and a means for tensioning the belt around the exciter pulley and the drive pulley.

Other features and aspects of the invention will become apparent by consideration of the following detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
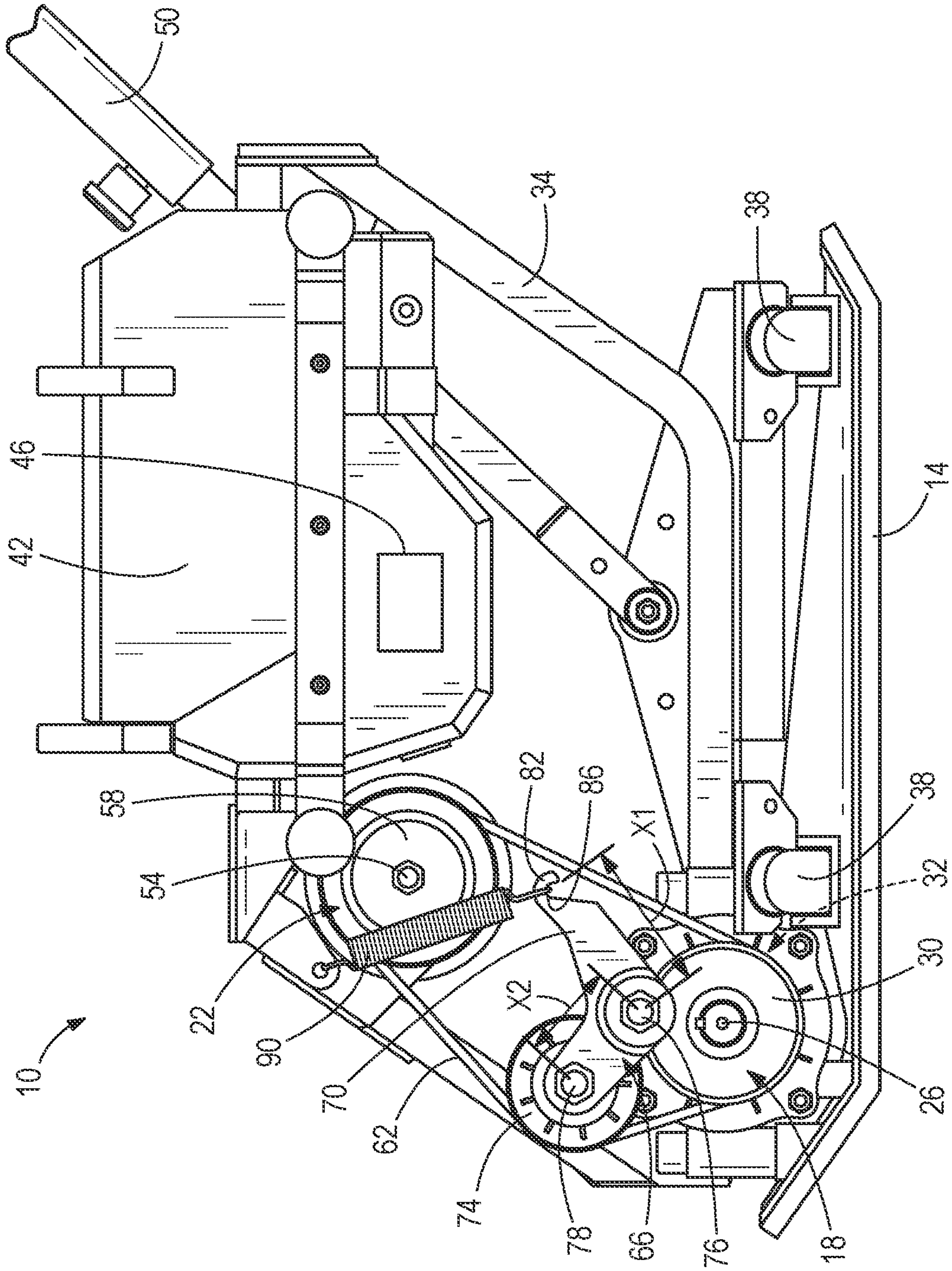
FIG. 1 is a plan view of a plate compactor according to one embodiment of the present disclosure.

As shown in FIG. 1, a plate compactor 10 includes a base plate 14, an exciter assembly 18 mounted to the plate 14, and an electric motor 22 to drive the exciter assembly 18, thus causing the plate 14 to vibrate. The exciter assembly 18 includes an exciter shaft 26 on which an exciter pulley 30 and an eccentric weight 32 are coupled for rotation. The plate compactor 10 also includes a frame 34 vibrationally isolated from the plate 14 via vibration dampers, such as springs or isolators 38. A battery pack 42 is also mounted to the frame 34 and is configured to provide power to the electric motor 22. A set of control electronics 46 (shown schematically) are configured to control operation of the electric motor 22. A handle 50 extends from the frame 34 and allows the plate compactor 10 to be pushed or maneuvered.

The motor 22 includes an output shaft 54 that is parallel with the exciter shaft 26. A drive pulley 58 is coupled for co-rotation with the output shaft 54 and is configured to drive rotation of the exciter pulley 30 via a belt 62 that is wrapped around both the exciter pulley 30 and drive pulley 58. The plate compactor 10 also includes a tensioner assembly 66 for the belt 62. The tensioner assembly 66 includes an idler arm 70 pivotably mounted to the frame 34, an idler pulley 74 rotatably mounted to a first end 78 of the idler arm 70, a hook 82 formed on an opposite, second end 86 of the idler arm 70, and a tension spring 90 interconnecting the frame 34 and the hook 82. The idler arm 70 is sized such that a distance X1 from a pivot point 76 to the second end 86 is greater than a distance X2 from the pivot point 76 to the first end 78. Thus, from the frame of reference of FIG. 1, the spring 90 biases the idler arm 70 in a counter-clockwise rotational direction to move the idler pulley 74 toward the belt 62 and maintain tension in the belt 62.

In operation, the belt 62 may be replaced on the plate compactor 10 by first pivoting the idler arm 70, from the frame of reference of FIG. 1, in a clockwise direction to disengage the idler pulley 74 from the belt 62. A new belt 62 is then wrapped around the exciter pulley 30, the drive pulley 58, and the idler pulley 74. The idler arm 70 may then be released, allowing the tension spring 90 to rebound and pivot the idler pulley 74 back toward the belt 62, thus creating tension in the belt 62.

The plate compactor 10 may then be operated. Specifically, the control electronics 46 activates the motor 22, thus rotating the output shaft 54 and drive pulley 58. Rotation of the drive pulley 58 results in rotation of the idler pulley 74 and exciter pulley 30, thus causing rotation of the exciter shaft 26. Rotation of the exciter shaft 26 causes rotation of the eccentric weight 32 about the exciter shaft 26, thus transmitting vibration from the exciter assembly 18 to the plate 14, which thereby compacts the ground underneath.

As the plate compactor 10 is operated over its lifetime, the belt 62 may stretch and thus extend in length, which can otherwise lead to reduced tension in the belt 62. However, the tensioner assembly 46 ensures that the belt 62 is maintained at a relatively constant tension throughout the life of the belt 62 because the spring 90 ensures that the idler pulley 74 is biased against the belt 62 regardless of how much the belt 62 has stretched, which increases the useful life of the belt 62. Also, the tensioner assembly 66 simplifies installation and removal of the belt 62 on the exciter and drive pulleys 30, 58, compared to a plate compactor without the tensioner assembly 46.

Figure 2:
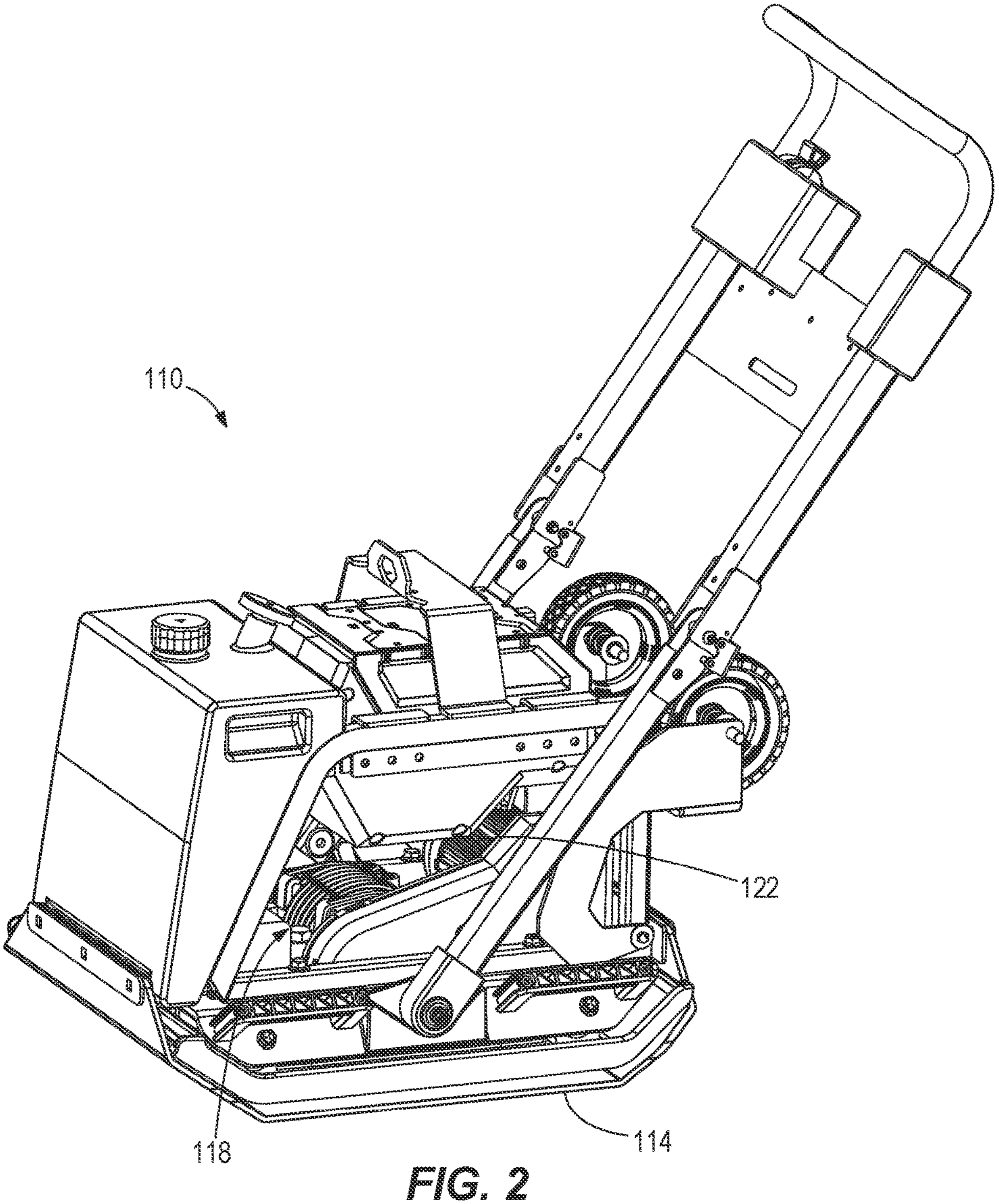
FIG. 2 is a perspective view of a plate compactor according to another embodiment of the present disclosure.
Figure 3:
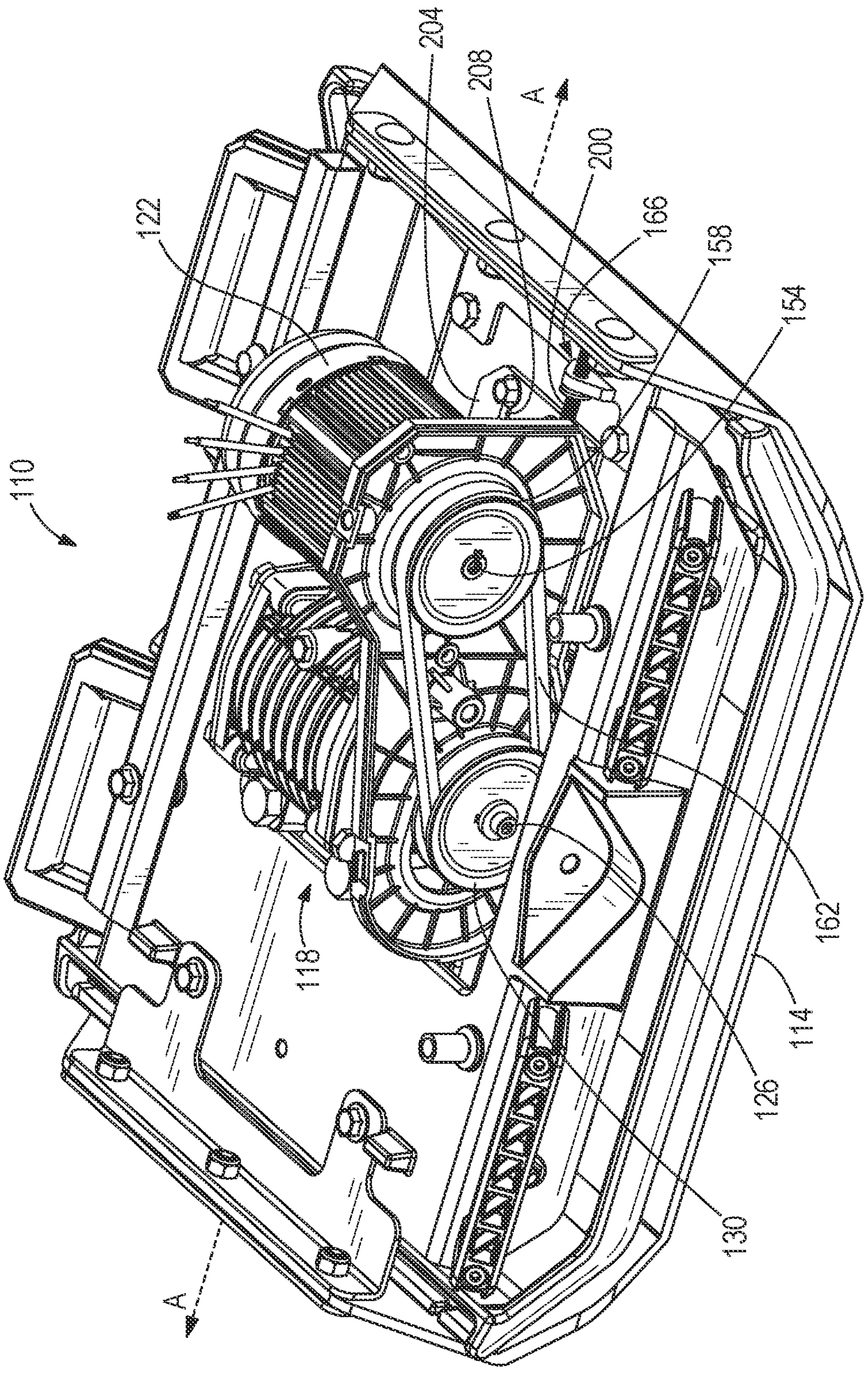
FIG. 3 is a perspective view of a portion of the plate compactor of FIG. 2, with components hidden to show a front side of a vibration mechanism.
Figure 4:
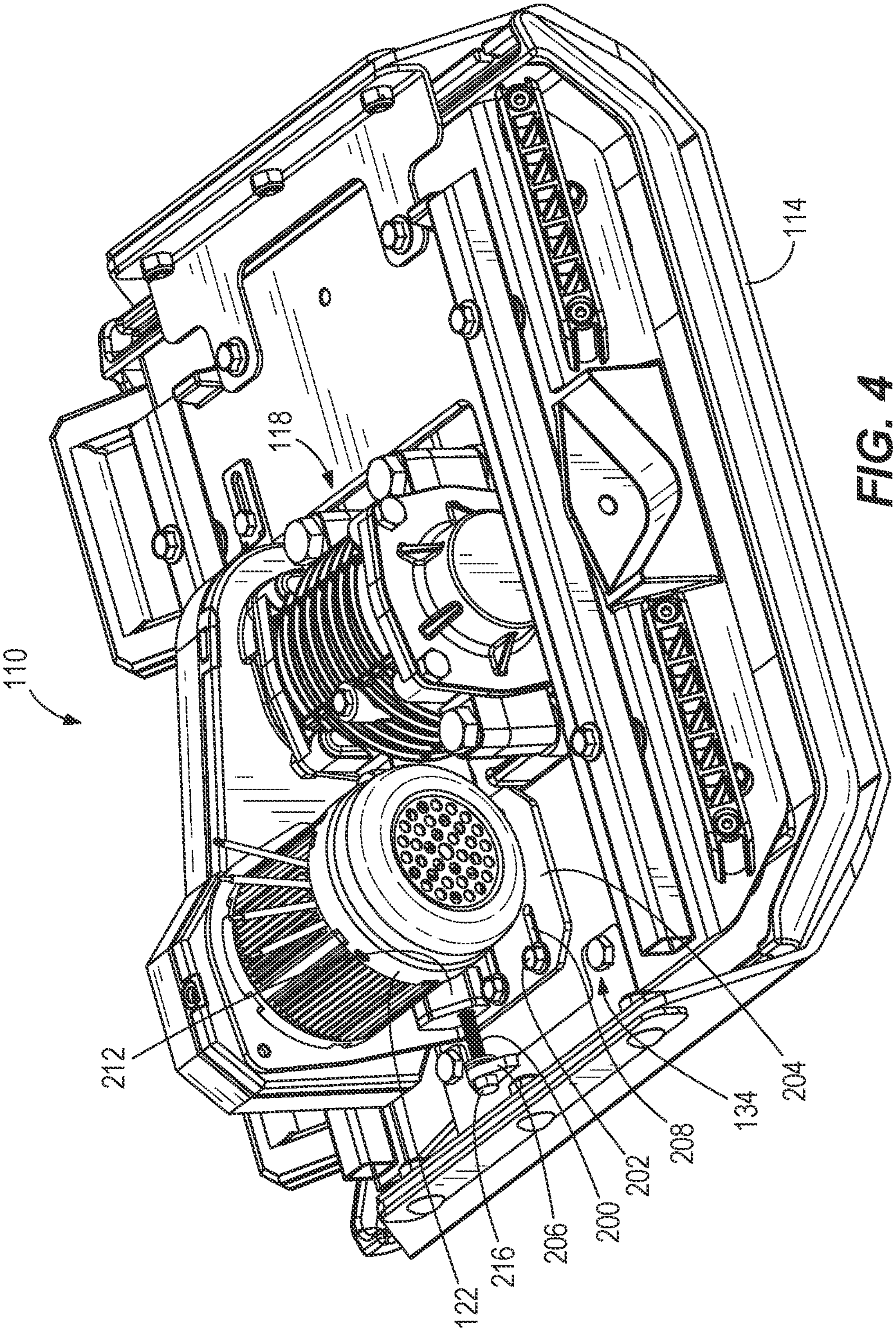
FIG. 4 is a perspective view of a portion of the plate compactor of FIG. 2, with components hidden to show a rear side of the vibration mechanism.

FIGS. 2-4 depict another embodiment of a plate compactor 110 including a tensioner assembly 166, with like features having like reference numerals plus the number "1" appended thereon. With reference to FIG. 2, the plate compactor 110 includes a base plate 114, an exciter assembly 118 mounted to the plate 114, and an electric motor 122 configured to drive the exciter assembly 118, thus causing the plate 114 to vibrate. The motor 122 is disposed on the plate 114 adjacent the exciter assembly 118 and oriented such that a motor output shaft 154 is parallel with an exciter shaft 126 of the exciter assembly 118 (FIG. 3). A drive pulley 158 is coupled for co-rotation with the motor output shaft 154 and configured to drive rotation of the exciter assembly 118 through a belt 162 that is wrapped around both the drive pulley 158 and an exciter pulley 130. The exciter pulley 130 is coupled for co-rotation with the exciter shaft 126.

Proper operation of the plate compactor 110 requires the belt 162 to maintain a minimum amount of tension. To maintain minimum belt tension, the plate compactor 110 is provided with a tensioner assembly 166 so that an operator can increase or decrease the tension in the belt 162. For example, as the belt 162 wears over time, an operator can increase the tension to maintain proper tension in the belt 162. Also, an operator may decrease the tension to remove and replace the belt 162.

The tensioner assembly 166 operates by increasing or decreasing a distance between the drive pulley 158 and the exciter pulley 130. With reference to FIGS. 3 and 4, the tensioner assembly 166 includes a threaded shaft 200 coupled to the compactor 110 and to the motor 122. The motor 122 is slidably supported upon the compactor 110 by a motor bracket 204, which includes slots 208 oriented parallel to a longitudinal axis A of the plate 114. A fastener 202 extends through each of the slots 208 to clamp the motor bracket 204 to the frame 134. The compactor 110 further includes a tab 206 on the frame 134 by which the threaded shaft 200 is threadedly coupled to the compactor 110. Similarly, the motor bracket 204 is threadedly coupled to the threaded shaft 200 via an internally threaded block 212. In other words, the threaded shaft 200 extends through the tab 206 and the block 212 to threadedly couple the frame 134 and the motor bracket 204. When the fastener 202 is loosened, thereby decreasing a clamping force on the motor bracket 204, rotation of the threaded shaft 200 causes sliding of the motor bracket 204 relative to the frame 134. The slots 208 constrain the sliding motion of the motor bracket 204 to a direction parallel to the longitudinal axis A of the plate 114. Therefore, rotation of the threaded shaft 200 increases or decreases the distance between the drive pulley 158 and the exciter pulley 130, depending on a direction of rotation of the threaded shaft 200. In the illustrated embodiment, the threaded shaft 200 includes a bolt head 216 affixed to a distal end of the shaft 200 on an opposite end of the shaft 200 from the motor bracket 204. Further, in some embodiments, the tensioner assembly 166 includes a thrust bearing or washer disposed between the bolt head 216 and the tab 206 to reduce friction between the bolt head 216 and the tab 206 during rotation of the threaded shaft 200 (e.g., during tensioning of the belt 162).

Although the invention has been described in detail with reference to certain preferred embodiments, variations and modifications exist within the scope and spirit of one or more independent aspects of the invention as described.

Various features of the invention are set forth in the following claims.

What is claimed is:

1. A compactor comprising:
- a plate;
- a frame coupled to the plate;
- an exciter assembly coupled to the plate and including
  - an exciter shaft,
  - an exciter pulley on the exciter shaft, and
  - an eccentric weight on the exciter shaft;
- a motor movably coupled to the frame and including
  - an output shaft, and
  - a drive pulley on the output shaft;
- a belt wrapped around the exciter pulley and the drive pulley; and
- a tensioner assembly including a threaded shaft,
- wherein a first end of the threaded shaft is coupled to the plate and a second end of the threaded shaft is coupled to the motor,
- wherein the motor is movable along an axis parallel to a longitudinal axis of the plate.

2. The compactor of claim 1, wherein the motor is movably coupled to the frame by a motor bracket.

3. The compactor of claim 2, wherein the motor bracket is threadedly coupled to the second end of the threaded shaft such that rotation of the threaded shaft results in sliding of the motor bracket.

4. The compactor of claim 3, wherein the exciter assembly is fixedly coupled to the plate.

5. The compactor of claim 2, wherein the motor bracket includes a slot oriented parallel to a longitudinal axis of the plate through which a fastener extends to selectively clamp the motor bracket to the frame.

6. The compactor of claim 5, wherein, when the fastener is loosened to release a clamping force between the motor bracket and the frame, the motor bracket is movable in a direction of the longitudinal axis in response to rotation of the threaded shaft to selectively tension the belt.

7. The compactor of claim 1, further comprising a plurality of vibration dampers configured to vibrationally isolate the frame from the plate.

8. A compactor comprising:
- a plate;
- a frame coupled to the plate;
- an exciter assembly coupled to the plate and including
  - an exciter shaft,
  - an exciter pulley on the exciter shaft, and
  - an eccentric weight on the exciter shaft;
- a motor coupled to the frame and including
  - an output shaft, and
  - a drive pulley on the output shaft; and
- a belt wrapped around the exciter pulley and the drive pulley; and
- means for tensioning the belt around the exciter pulley and the drive pulley, wherein the motor is movably coupled to the frame, and wherein the motor is movable along an axis parallel to a longitudinal axis of the plate.

9. The compactor of claim 8, wherein the tensioning means is configured to selectively increase a distance between the motor and the exciter.

10. The compactor of claim 9, wherein the motor is slidably coupled to the plate, and wherein the exciter is fixedly coupled to the plate.

11. The compactor of claim 8, wherein the tensioning means is configured to increase tension of the belt around the exciter pulley and the drive pulley.

* * * * *